United States Patent [19]

Yau

[11] 4,324,833

[45] Apr. 13, 1982

[54] WET PROCESS MAT BINDER

[75] Inventor: Ben J. Yau, Reynoldsburg, Ohio

[73] Assignee: Owens-Corning Fiberglas Corporation, Toledo, Ohio

[21] Appl. No.: 79,397

[22] Filed: Sep. 27, 1979

[51] Int. Cl.$^3$ .................. C08L 3/02; D08N 5/00; D08N 3/12
[52] U.S. Cl. .................. 428/290; 428/288; 428/261; 428/273; 524/47; 524/503
[58] Field of Search ............. 260/17.4 ST, 17.3, 17.2, 260/29.3; 428/268, 271, 272, 273, 144, 146, 147, 149, 261, 290; 427/442, 443, 447

[56] References Cited

U.S. PATENT DOCUMENTS

| | | | |
|---|---|---|---|
| 2,099,094 | 11/1937 | Avery | 427/202 |
| 2,473,463 | 6/1949 | Adams | 260/17.3 |
| 3,355,314 | 11/1967 | Gagnon et al. | 428/436 |
| 3,472,804 | 10/1969 | Nobile et al. | 260/17.2 |
| 3,488,310 | 6/1970 | McCombs et al. | 428/436 |

*Primary Examiner*—V. P. Hoke
*Attorney, Agent, or Firm*—Ronald C. Hudgens; Philip R. Cloutier

[57] ABSTRACT

A wet process mat binder comprising a phenolic resin, urea, melamine, starch and polyvinyl alcohol is disclosed. The pH of the formula is maintained at about 5.5.

10 Claims, No Drawings

WET PROCESS MAT BINDER

BACKGROUND OF THE INVENTION

This invention relates to wet process mat binders.

In one of its more specific aspects, this invention relates to wet process mat binders which impart improved dry and wet strength properties to mats to which the binders are applied.

Wet process mat production is well known. Generally, the process comprises dispersing fibers, such as glass fibers, synthetic fibers or natural fibers, in an aqueous solution of a dispersant, withdrawing a layer of the fibers from the solution as a mat on a continuous belt, applying a binder to the mat and curing the binder to form a unified mat.

The strength of the resulting mat is attributable to several factors, one of which is the nature of the binder applied.

STATEMENT OF THE INVENTION

There has now been discovered an aqueous phenolic resin-urea based wet process mat binder comprising an aqueous solution of a partially methylated melamine-formaldehyde resin and a polyvinyl alcohol, the aqueous solution having a pH within the range of from about 3.5 to about 6.5.

Also, there has been discovered a fibrous mat comprising the cured residue from an aqueous solution comprising a phenolic resin-urea based binder comprising a partially methylated melamine-formaldehyde resin and a polyvinyl alcohol, the residue being deposited on said mat in the form of an aqueous solution having a pH within the range of from about 3.5 to about 6.5.

Phenolic resin is a major component of the binder system. Polyvinyl alcohol is another major component and facilitates the formation of an exceptionally tough, tear-resistant film with good abrasion resistance. Methylated melamine-formaldehyde resin acts as a cross-linking agent and improves the water resistance. Urea is used to react with free formaldehyde contained in the phenolic resin and starch is used as an extender.

The phenolic resin is included in the composition in an amount within the range of from about 10 to about 80 weight percent. Any suitable phenolic resin can be employed. Preferable resins are RE-131 and RE-136 from Owens-Corning Fiberglas. ®
®Registered Trademark of Owens-Corning Fiberglas Corporation, Toledo, Ohio The polyvinyl alcohol is included in the composition in an amount within the range of from about 10 to about 80 weight percent. Any medium or high viscosity polyvinyl alcohol, above 90% hydrolysis, can be used. Suitable polyvinyl alcohols include ELVANOL 71-30, 72-60, 71-24 and 72-51 from duPont de Nemours & Co.

The melamine-formaldehyde resin can be any partially or fully methylated one and is contained in the composition in an amount within the range of from about 1 to about 11 weight percent. Suitable materials include Cymel 373 and Cymel 303 from American Cyanamid Co.

Urea is employed in the composition in an amount within the range of from about 2 to about 12 weight percent.

The starch should be one possessing good water dispersion. It is employed in an amount within the range of from about 10 to about 30 weight percent. Suitable starches include amaizo, maltodextrin or Fro-Dex 10 from American Maize-Products Company.

The pH of the composition can be adjusted to a value within the range of from about 3.5 to about 6.5 with any weak acid, such as acetic acid or phosphoric acid. Phosphoric acid is preferred.

In the preferred compositions, in terms of weight percent, the phenolic resin is employed in an amount within the range of from about 29.8 to about 33.8, preferably 31.8; the polyvinyl alcohol in an amount within the range of from about 26.2 to about 30.2, preferably 28.2; the melamine in an amount within the range of from about 8.2 to about 10.2, preferably 9.2; the urea in an amount within the range of from about 10.1 to about 11.1, preferably about 10.6; the starch in an amount within the range of from about 19.2 to about 21.2; preferably about 20.2, with 20 percent phosphoric acid being employed to bring the pH of the composition into the aforesaid range.

In the preferred composition, a silane in the form of an organic silane, such as g-aminopropyl triethoxysilane, from Union Carbide, under the trade name A-1100 is also included in an amount of about 0.5 weight percent.

EXAMPLE I

This example demonstrates the preparation of the composition of this invention.

A premix was formed of 79.5 pounds of phenolic resin (40 percent solid) and 21.2 pounds of urea (50 percent solid). The mixture was stirred for two hours, being acidified towards the end of that period with 20% phosphoric acid to a pH of 5.5.

A mixture of 29.7 pounds of polyvinyl alcohol (Evanol 71-30, 95 percent solid) and 20.2 pounds of dextrin were added to 800 pounds of water and, after mixing thoroughly, the resulting composite was heated to 200° F. at which temperature it was held for 20 minutes, being cooled thereafter to 110° F. 1.2 pounds of a silane and the premix of phenolic resin and urea were then added. Then 10.8 pounds of melamine resin (Cymel 373, 85 percent solid) were added.

Mixing was continued for 20 minutes during which time the pH was adjusted to 5.5 using 20% phosphoric acid.

The composition of this invention is applied to the wet mat in the usual manner, preferably from a weir box.

EXAMPLE II

The data below present representative tests on various glass mats employing compositions within the scope of the claims defining the invention, after drying and curing.

| Binder Sample | Binder Content, % | Mat. Wgt., #/100 sq.ft. | Tensile Strength* Dry, # | Tensile Strength* Wet, #** | Wet Strength Retention, % |
| --- | --- | --- | --- | --- | --- |
| 1 | 23.0 | 2.11 | 54.0 | 46.0 | 85 |
| 2 | 28.9 | 2.25 | 44.1 | 34.4 | 78 |
| 3 | 24.0 | 2.15 | 51.3 | 41.8 | 82 |
| 4 | 18.7 | 2.02 | 46.1 | 37.1 | 80 |

*Strength based on 1 inch test strip.
**Tensile strength of sample was measured following a 30-minute soak in cold water.

The above data indicate that the mats exhibited good tensile strengths and good wet strength retention as a percentage of dry strength. Accordingly, the mat is acceptable as a base for subsequent saturation with asphaltic compositions to produce roofing products.

It is evident that various modifications can be made to this invention. Such, however, are to be considered within the scope of this invention.

We claim:

1. A wet process mat binder comprising an aqueous solution of a phenolic resin, a methylated melamine formaldehyde resin and a polyvinyl alcohol, said aqueous solution having a pH within the range of from about 3.5 to about 6.5.

2. The composition of claim 1 in which said solution further comprises urea.

3. The composition of claim 1 in which said methylated melamine formaldehyde resin is partially or fully methylated.

4. The composition of claim 2 in which said composition further comprises starch.

5. The composition of claim 4 in which said composition comprises, on a weight percent basis methylated, melamine formaldehyde resin from about 1 to about 11, polyvinyl alcohol from about 10 to about 80, phenolic resin from about 10 to about 80, urea from about 2 to about 12, and starch from about 10 to about 30.

6. The composition of claim 4 in which said composition comprises, on a weight percent basis methylated, melamine formaldehyde resin from about 8.2 to about 10.2, polyvinyl alcohol from about 26.2 to about 30.2, phenolic resin from about 29.8 to about 33.8, urea from about 10.1 to about 11.1 and starch from about 19.2 to about 21.2

7. The composition of claim 6 in which said resin is partially methylated.

8. A fibrous mat impregnated with the product attained by curing the composition of claim 5.

9. A fibrous mat impregnated with the product obtained by curing the composition of claim 6.

10. The fibrous mat of claim 6 saturated with an asphaltic composition.

* * * * *